(12) United States Patent
Leblanc et al.

(10) Patent No.: US 10,730,560 B2
(45) Date of Patent: Aug. 4, 2020

(54) SUSPENDED SIDE SILL REINFORCEMENT

(71) Applicant: Honda Motor Co., Ltd., Tokyo (JP)

(72) Inventors: Carolyn A. Leblanc, Marysville, OH (US); Aron K. Madsen, Marysville, OH (US); Joseph M. Riggsby, Marysville, OH (US); Timothy J. Palesano, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 8 days.

(21) Appl. No.: 16/185,290

(22) Filed: Nov. 9, 2018

(65) Prior Publication Data

US 2020/0148272 A1    May 14, 2020

(51) Int. Cl.
*B62D 25/20* (2006.01)
*B62D 25/02* (2006.01)
*B62D 27/02* (2006.01)
*B62D 21/15* (2006.01)

(52) U.S. Cl.
CPC .......... *B62D 25/025* (2013.01); *B62D 27/02* (2013.01); *B62D 21/157* (2013.01)

(58) Field of Classification Search
CPC .... B62D 25/025; B62D 21/157; B62D 27/02; B62D 27/023
USPC ............................................. 206/209, 187.12
See application file for complete search history.

(56) References Cited

U.S. PATENT DOCUMENTS

| | | | |
|---|---|---|---|
| 8,894,130 B2 | 11/2014 | Iwamoto et al. | |
| 8,998,263 B1 | 4/2015 | Yustick et al. | |
| 9,555,836 B2 | 1/2017 | Yamamoto et al. | |
| 9,725,118 B2 | 8/2017 | Alwan et al. | |
| 2018/0134320 A1 | 5/2018 | Jeong | |

FOREIGN PATENT DOCUMENTS

| | | | | |
|---|---|---|---|---|
| DE | 19528874 | * | 2/1997 | ............ B62D 25/02 |
| DE | 102012206032 A1 | | 10/2013 | |
| DE | 102015215655 A1 | | 2/2017 | |
| KR | 100320822 B1 | | 1/2002 | |
| KR | 101807057 B1 | | 12/2017 | |

* cited by examiner

*Primary Examiner* — Dennis H Pedder
(74) *Attorney, Agent, or Firm* — Honda Patents & Technologies North America, LLC; Mark E. Duell (57) ABSTRACT

A reinforcement unit for a side sill of a vehicle is provided. The side sill includes an inner panel and an outer panel having an upper flange and a lower flange. The reinforcement unit includes an outer reinforcement member located between the inner panel and the outer panel of the side sill, an inner reinforcement member located between the inner panel and the outer panel of the side sill, and straps attached to the upper flange and to the lower flange of the outer panel and spanning from the upper flange to the lower flange between the outer reinforcement member and the inner reinforcement member, the inner reinforcement member being attached to the straps.

14 Claims, 9 Drawing Sheets

SECTION A-A

SECTION A-A
FIG. 5

SECTION B-B

SUSPENDED SIDE SILL REINFORCEMENT

TECHNICAL FIELD

The embodiments are related to the field of body structures of vehicles, and more specifically to a side sill construction of a vehicle.

BACKGROUND

Typically, a vehicle body structure includes a side sill construction in which the cross-section is shaped in a form of a boxed-channel. The side sill extends in a longitudinal direction of the vehicle body, i.e., between the front and rear wheels. In order to improve the structural integrity by increasing the energy absorption capability of the section during a crush event a reinforcement unit is provided within the side sill A vehicle body structure having such a side sill reinforcement is well known. However, traditional methods of reinforcing the outer stiffener can have insufficient energy absorption capability c to withstand crush loads transmitted to the vehicle body through the sill.

Therefore, there is established a need for an improved side sill reinforcement unit that extends structural integrity by increasing the energy absorption capability.

APPLICATION SUMMARY

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

According to one aspect, a reinforcement unit for a side sill of a vehicle, the side sill including an inner panel and an outer panel having an upper flange and a lower flange, includes an outer reinforcement member located between the inner panel and the outer panel of the side sill, an inner reinforcement member located between the inner panel and the outer panel of the side sill, and a strap attached to the upper flange and to the lower flange of the outer panel and spanning from the upper flange to the lower flange between the outer reinforcement member and the inner reinforcement member, the inner reinforcement member being attached to the strap.

According to another aspect, a reinforcement unit for a side sill of a vehicle, the side sill including an inner panel and an outer panel having an upper flange and a lower flange, includes an outer reinforcement member located between the inner panel and the outer panel of the side sill, an inner reinforcement member located between the inner panel and the outer panel of the side sill, and a plurality of straps attached to the upper flange and to the lower flange of the outer panel and spanning from the upper flange to the lower flange between the outer reinforcement member and the inner reinforcement member, the inner reinforcement member being attached to the plurality of straps.

According to yet another aspect, a side sill of a vehicle includes an inner panel, an outer panel having an upper flange and a lower flange, and a reinforcement unit. The reinforcement unit includes an outer reinforcement member located between the inner panel and the outer panel of the side sill, an inner reinforcement member located between the inner panel and the outer panel of the side sill, and a strap attached to the upper flange and to the lower flange of the outer panel and spanning from the upper flange to the lower flange between the outer reinforcement member and the inner reinforcement member, the inner reinforcement member being attached to the strap.

The figures depict various embodiments for purposes of illustration only. One skilled in the art will readily recognize from the following discussion that alternative embodiments of the structures and methods illustrated herein may be employed without departing from the principles of the embodiments described herein.

DETAILED DESCRIPTION

Figure 1:
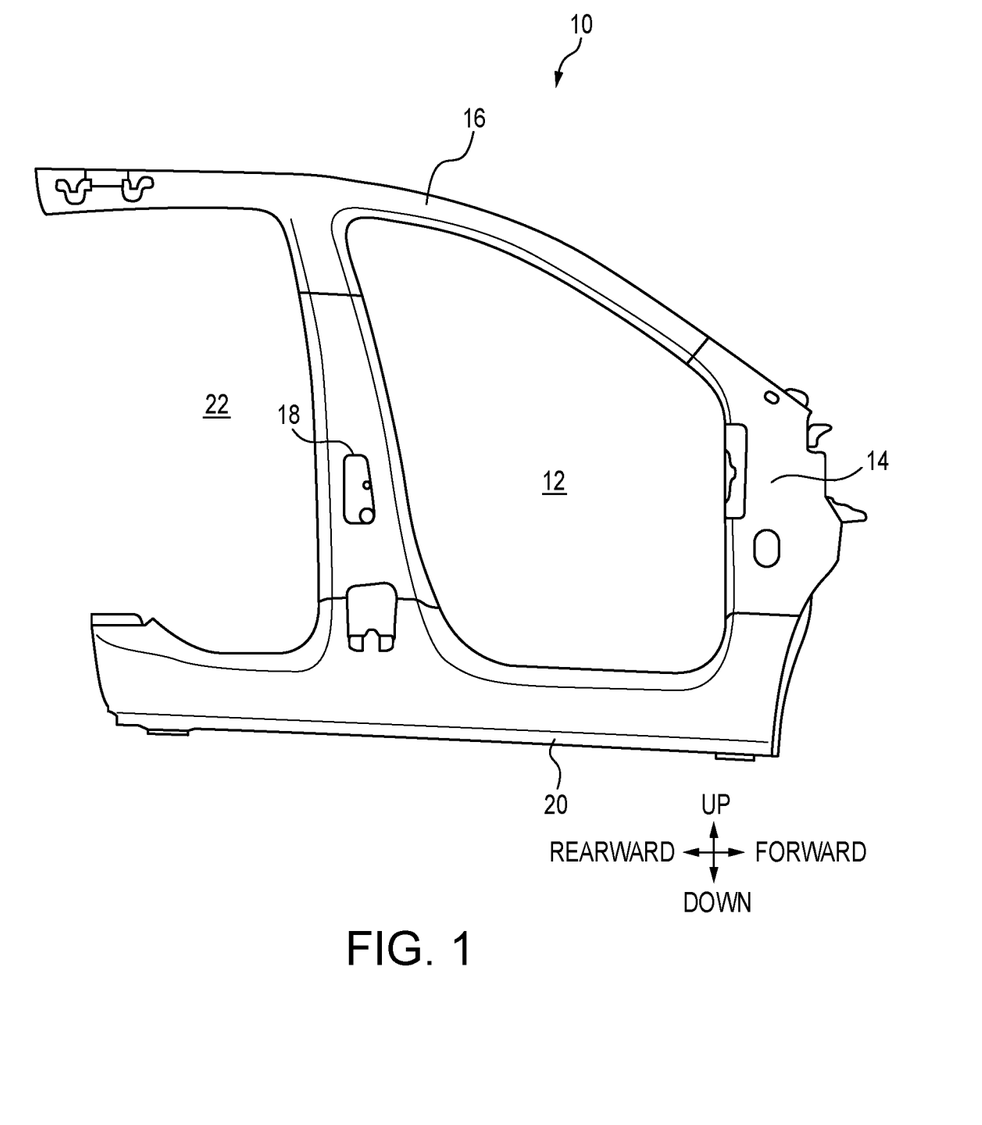
FIG. 1 illustrates an inner side view of a left side of a body structure of a vehicle that defines a front door opening of the body structure.
Figure 2:
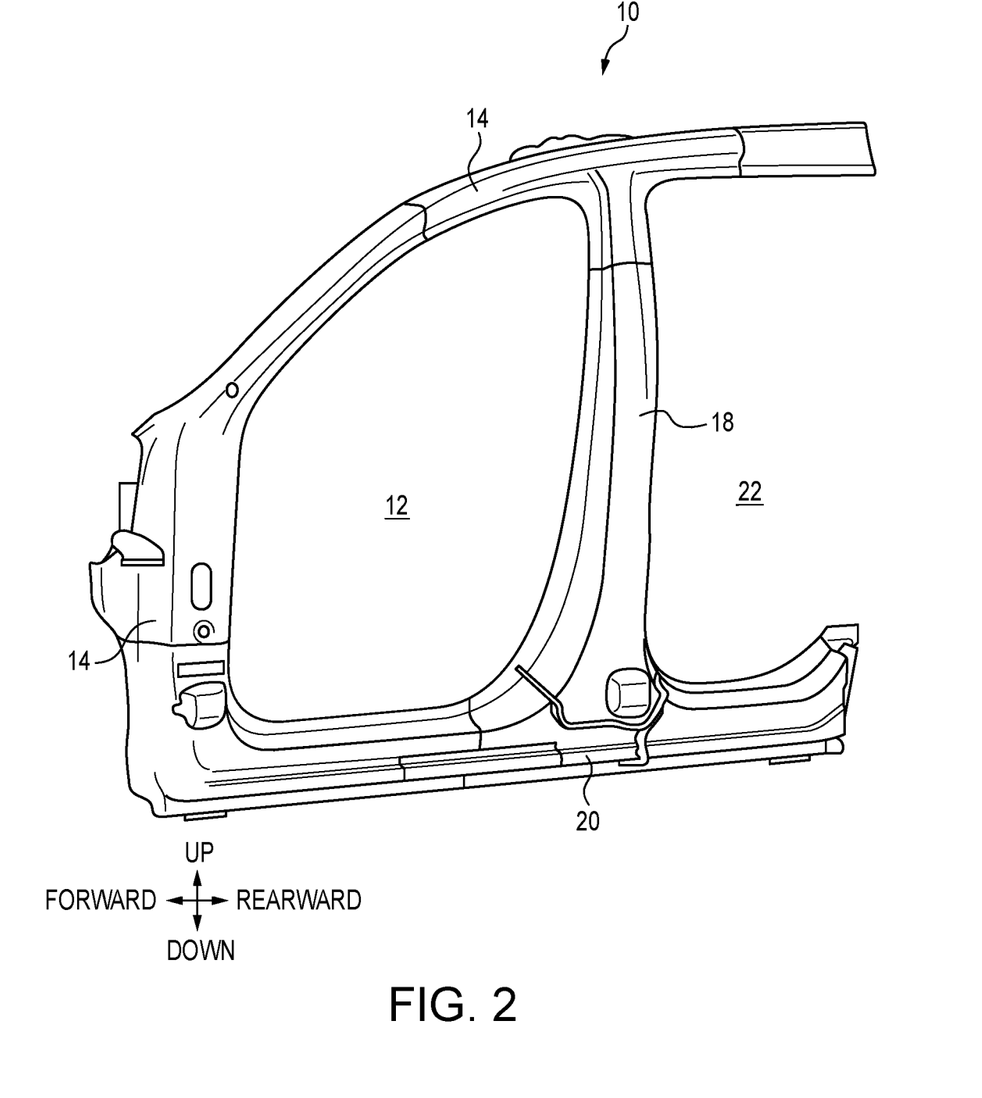
FIG. 2 illustrates an outer side view of the left side of the body structure of FIG. 1 defines the front door opening of the body structure.

FIGS. 1-2 illustrate an embodiment of a left side of a body structure 10 of a vehicle 5 that defines front door opening 12 of the body structure 10. The front door opening 12 is surrounded by a A-pillar 14 longitudinally forward of the door opening 12, a roof rail 16 vertically above the door opening 12, a B-pillar 18 longitudinally rearward of the door opening 12, and a side sill 20 vertically below the door opening 12. The side sill 20 may also extend longitudinally rearward of the B-pillar 18, particularly in four-door vehicles commonly referred to as sedans, with a rear door opening 22 longitudinally rearward of the B-pillar 18. The right side (not illustrated) of the body structure 10 is a mirror image of the left side of the body structure 10 illustrated in FIGS. 1-2, and the description below is equally applicable to the right side as the left side.

Figure 3:
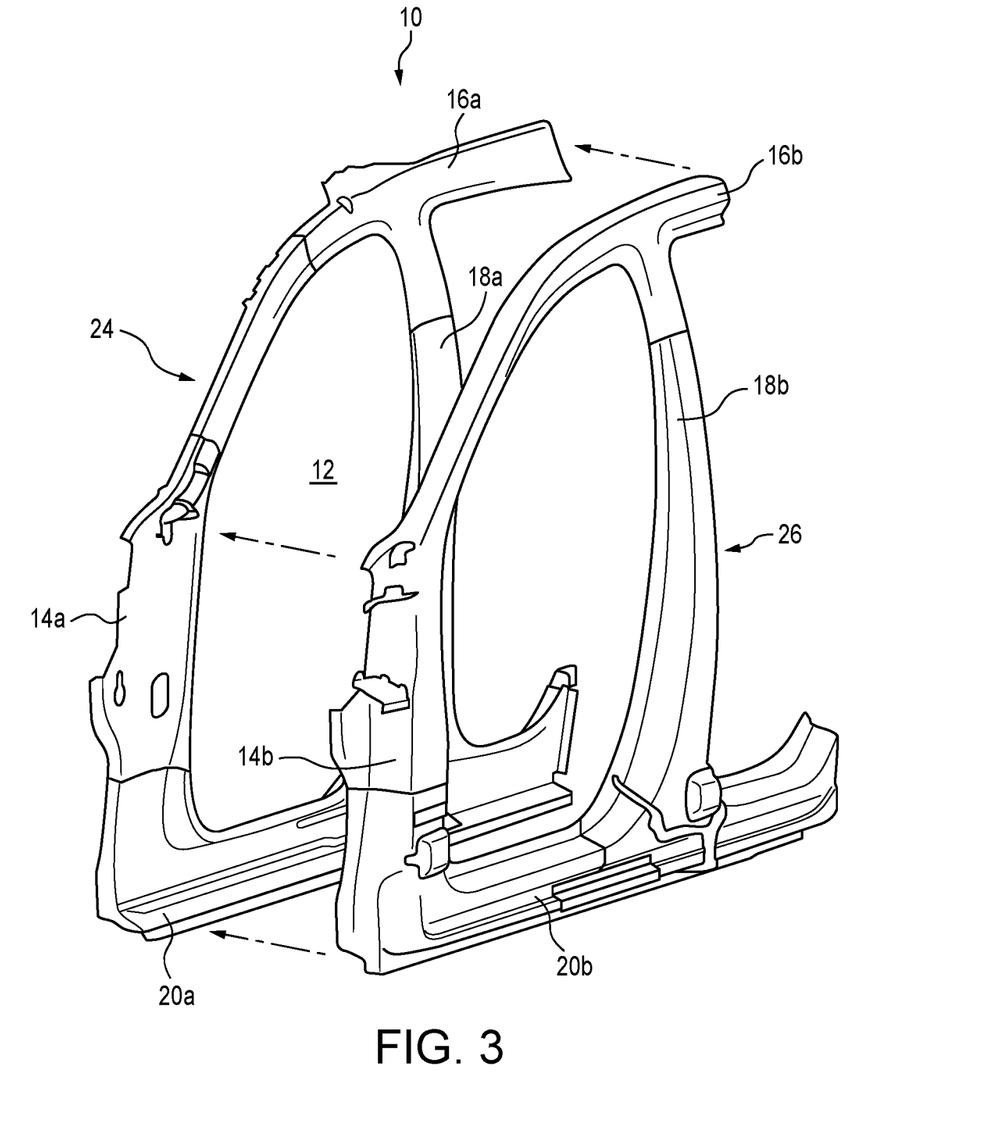
FIG. 3 is an exploded perspective view of the left side of the body structures of FIGS. 1 and 2 illustrating the inner door ring and the outer door ring.

As illustrated in FIG. 3, the side of the body structure 10 defining the front door opening 12 is constructed from an inner ring 24 and an outer ring 26 that are formed separately by a hot stamping process. The inner ring 24 and the outer ring 26 are attached together, such as by welds, to form the side of the body structure 10. As a result, the A-pillar 14 is constructed of an inner A-pillar panel 14a and an outer A-pillar panel 14b. The B-pillar 18 is constructed of an inner B-pillar panel 18a and an outer B-pillar panel 18b. The roof rail 16 is constructed of an inner roof rail panel 16a and an outer roof rail panel 16b. The body structure 10, including all of the associated parts described below, may be constructed of steel, aluminum, magnesium, or any other suitable material known to a person of ordinary skill in the art.

Figure 4:
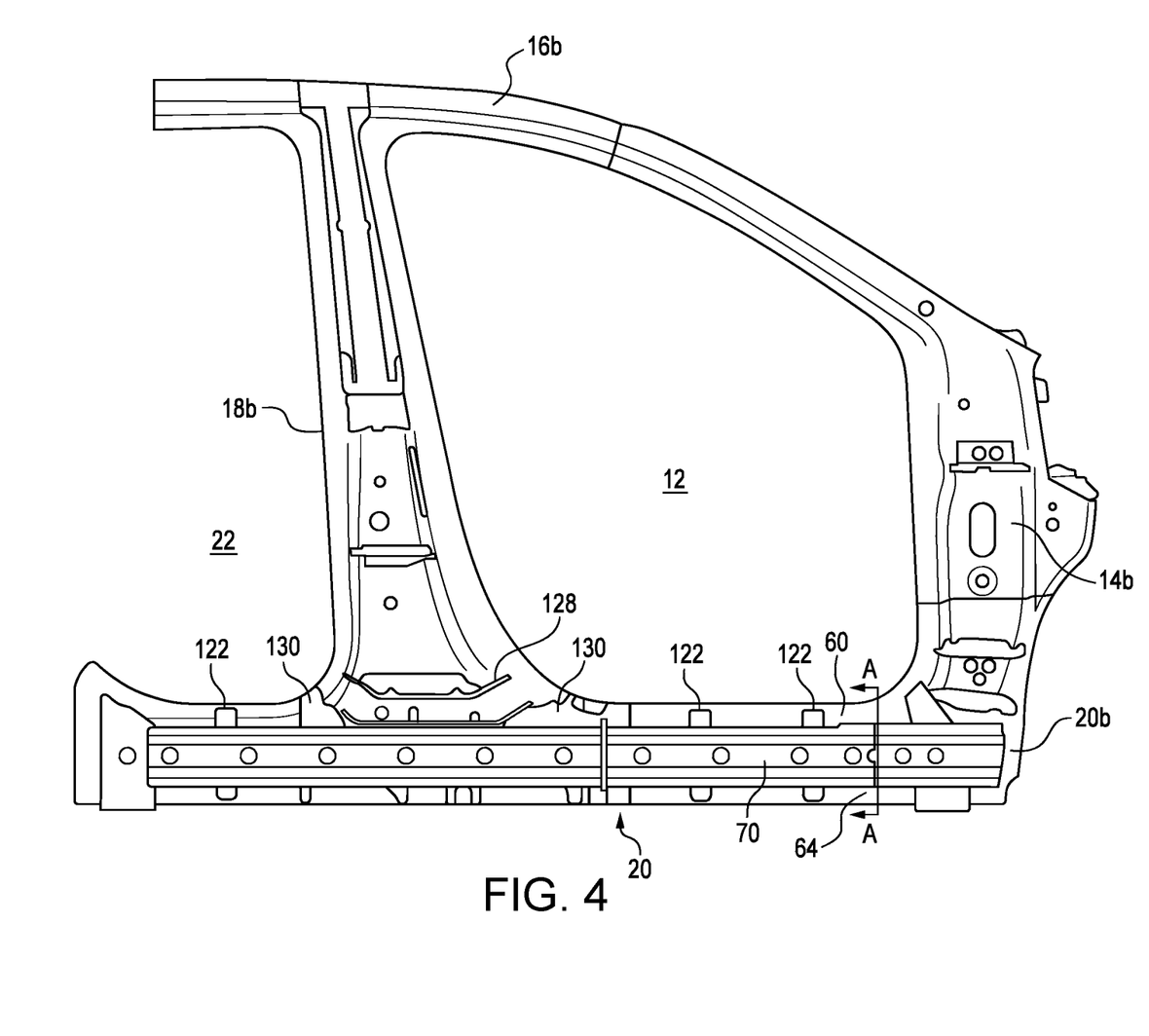
FIG. 4 illustrates an inner side view of the outer door ring with an installed reinforcement unit.
Figure 5:
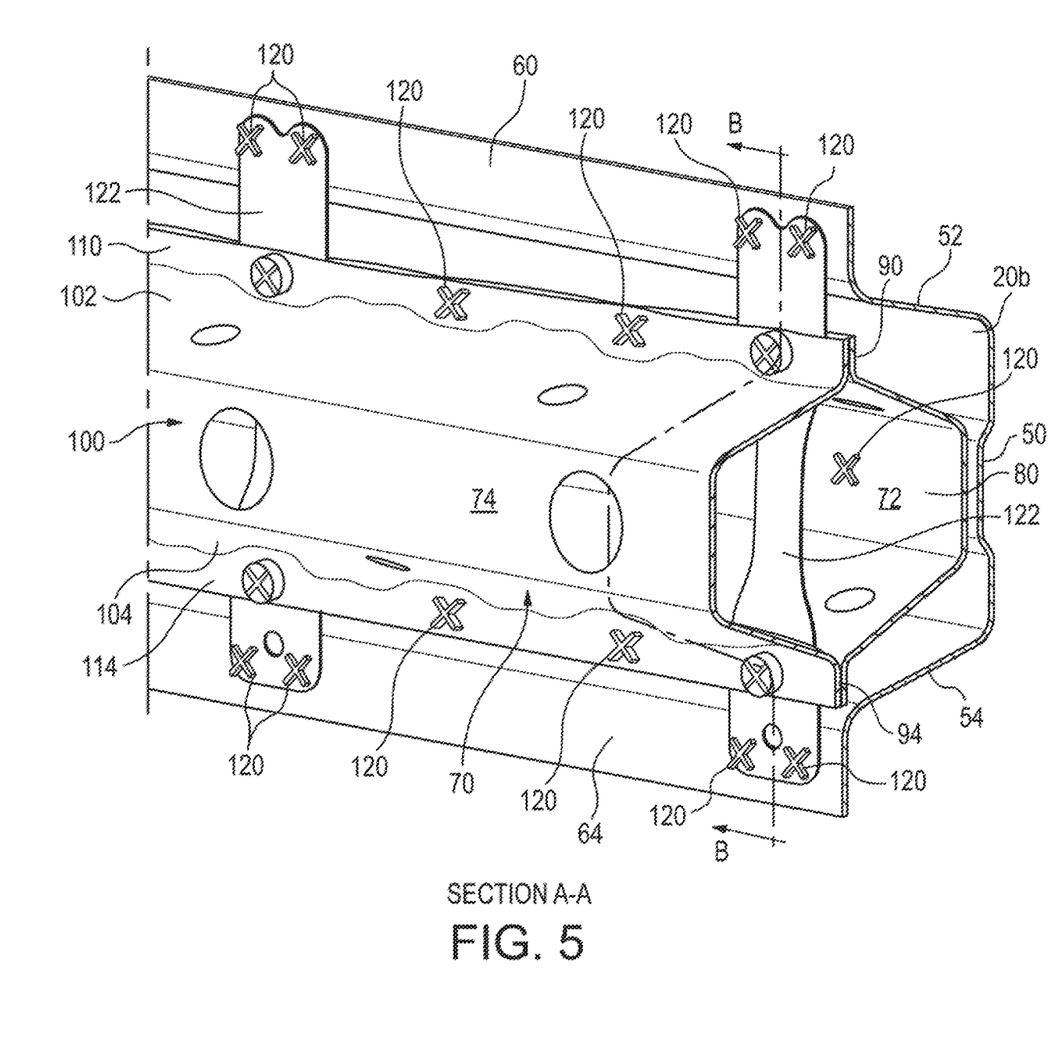
FIG. 5 illustrates a perspective sectional view taken along line A-A of FIG. 4 of an outer side sill panel of the outer door ring and the reinforcement unit.
Figure 6:
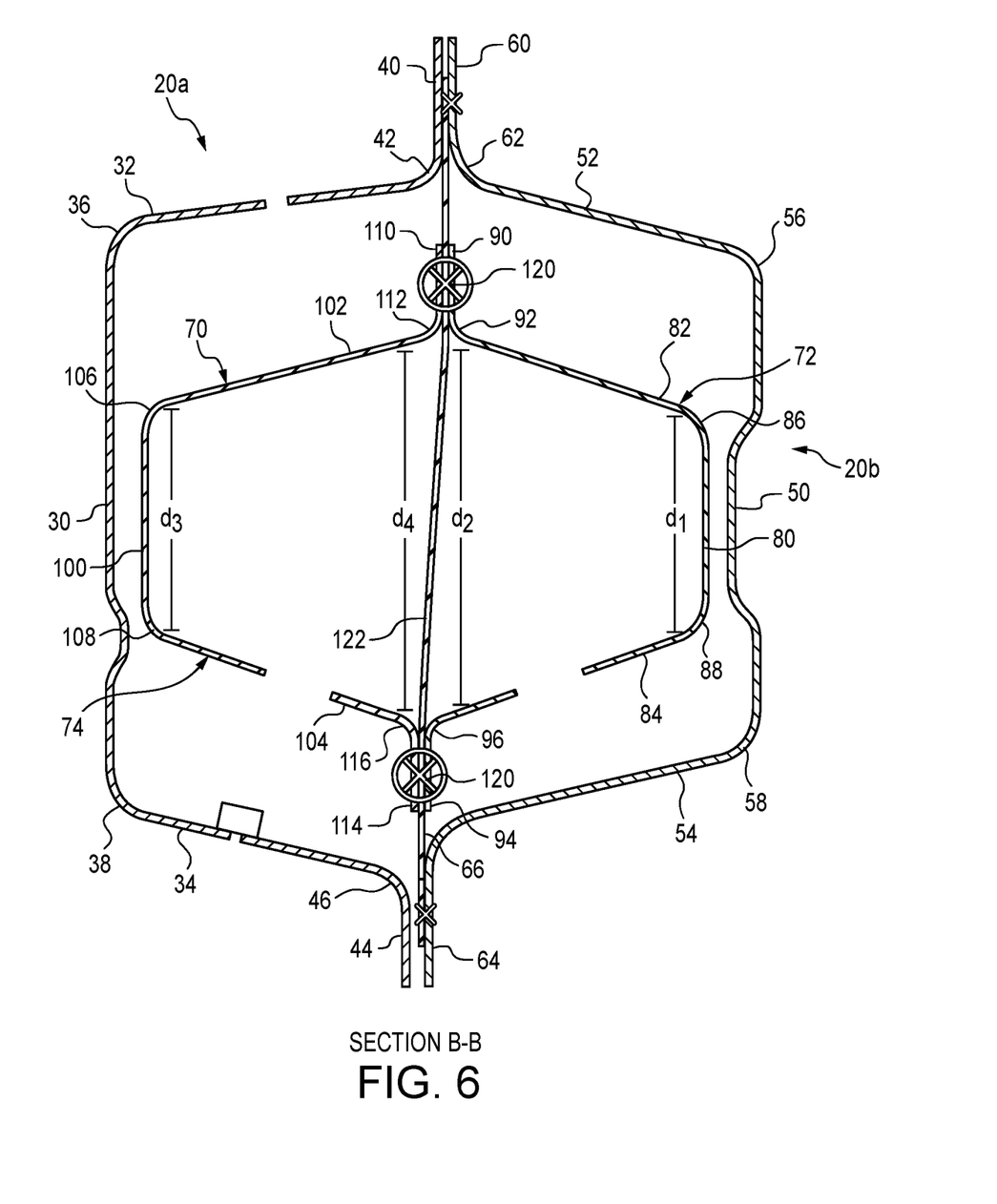
FIG. 6 is a cross-section view along line B-B of FIG. 5.

With reference to FIGS. 4-8, the side sill 20 is constructed of an inner side sill panel 20a and an outer side sill panel 20b. As particularly illustrated along section B-B of FIG. 5 illustrated in FIG. 6, the inner side sill panel 20a is a generally U-shaped structure having a base portion 30, and two sidewalls 32, 34 extending outwardly from opposite edges 36, 38 of the base portion 30. The inner side sill panel 20a has an upper flange 40 extending upwardly from a distal edge 42 of the upper sidewall 32 and a lower flange 44 extending downwardly from a distal edge 46 of the lower sidewall 34 of the inner side sill panel 20a. The outer side sill panel 20b is a generally U-shaped structure having a base portion 50, and two sidewalls 52, 54 extending inwardly from opposite edges 56, 58 of the base portion 50. The outer side sill panel 20b has an upper flange 60 extending upwardly from a distal edge 62 of the upper sidewall 52 and a lower flange 64 extending downwardly from a distal edge 66 of the lower sidewall 54 of the outer side sill panel 20b.

The side sill 20 is described in greater detail in FIGS. 4-8. The side sill 20 includes a reinforcement unit 70 within the side sill 20 providing structural support for the body structure 10. The side sill 20, with the reinforcement unit 70, is critical as a structural support in a side impact event, and the side sill 20, with the reinforcement unit 70, may be a load pathway in the event of a rear or front impact event.

In the embodiments illustrated in FIGS. 4-8, the reinforcement unit 70 includes an outer reinforcement member 72 located between the inner side sill panel 20a and the outer side sill panel 20b and an inner reinforcement member 74 located between the inner side sill panel 20a and the outer side sill panel 20b. The outer reinforcement member 72 is a generally U-shaped structure nested in the outer side sill panel 20b having a base portion 80, and two sidewalls 82, 84 extending inwardly from opposite edges 86, 88 of the base portion 80 in a diverging fashion such that the distance $d_2$ between the two sidewalls 82, 84 at the distal ends 92, 96 is greater than the distance $d_1$ between the two sidewalls 82, 84 at the base portion 80. An upper flange 90 extends upwardly from the distal end 92 of the upper sidewall 82, and a lower flange 94 extends downwardly from the distal end 96 of the lower sidewall 84.

The inner reinforcement member 74 is also a generally U-shaped structure nested in the inner side sill panel 20a having a base portion 100 and two sidewalls 102, 104 extending outwardly from opposite edges 106, 108 of the base portion 100 in a diverging fashion such that the distance $d_4$ between the two sidewalls 102, 104 at the distal ends 112, 116 is greater than the distance $d_3$ between the two sidewalls 102, 104 at the base portion 100. An upper flange 110 extends upwardly from the distal end 112 of the upper sidewall 102, and a lower flange 114 extends downwardly from the distal end 116 of the lower sidewall 104.

The inner reinforcement member 74 and outer reinforcement member 72, when brought together such that the respective upper flanges 110, 90 are in contact and the respective lower flanges 116, 96 are in contact, form the reinforcement unit 70 that is located within the side sill 20.

As illustrated in FIG. 5, the base portion 80 of the outer reinforcement member 72 is attached to the base portion 50 of the outer side sill panel 20b. The attachment, in the illustrated embodiment, is by at least one weld 120, but any other attachment method known to a person of ordinary skill in the art may also be used.

The reinforcement unit 70 may also include at least one strap 122 attached to the upper flange 60 and to the lower flange 64 of the outer side sill panel 20b and spanning from the upper flange 60 to the lower flange 64 between the outer reinforcement member 72 and the inner reinforcement member 74. The number of straps 122 may be dependent on the size of the body structure 10 and the length of side sill 20. In the embodiment illustrated, the side sill 20 includes three (3) straps 122.

The inner reinforcement member 74 is attached to each of the straps 122 applied to the side sill 20. In the illustrated embodiment, the upper flange 110 that extends upwardly from the distal end 112 of the upper sidewall 102 is attached to the strap 122, and the lower flange 114 that extends downwardly from the distal end 116 of the lower sidewall 104 is attached to the strap 122. The attachment for each of the upper flange 110 and the lower flange 114, in the illustrated embodiment, is by at least one weld 120, but any other attachment method known to a person of ordinary skill in the art may also be used. The attachment of the inner reinforcement member 74 to the straps 122 is the only attachment made, as there is no attachment to the inner side panel 20a. Thus, the inner reinforcement member 74 is considered to be suspended within the fully assembled side sill 20 when the inner side sill panel 20a and the outer side sill panel 20b are assembled together.

At the junction 128 of the B-pillar 18 and the side sill 20, there may be a need for further reinforcement in the side sill 20. Therefore, in an embodiment illustrated in FIGS. 4 and 7-9, a shear plate 130 is positioned between the inner reinforcement member 74 and the outer reinforcement member 72 of the reinforcement unit 70 located further between the inner side sill panel 20a and the outer side sill panel 20b of the side sill 20.

Figure 7:
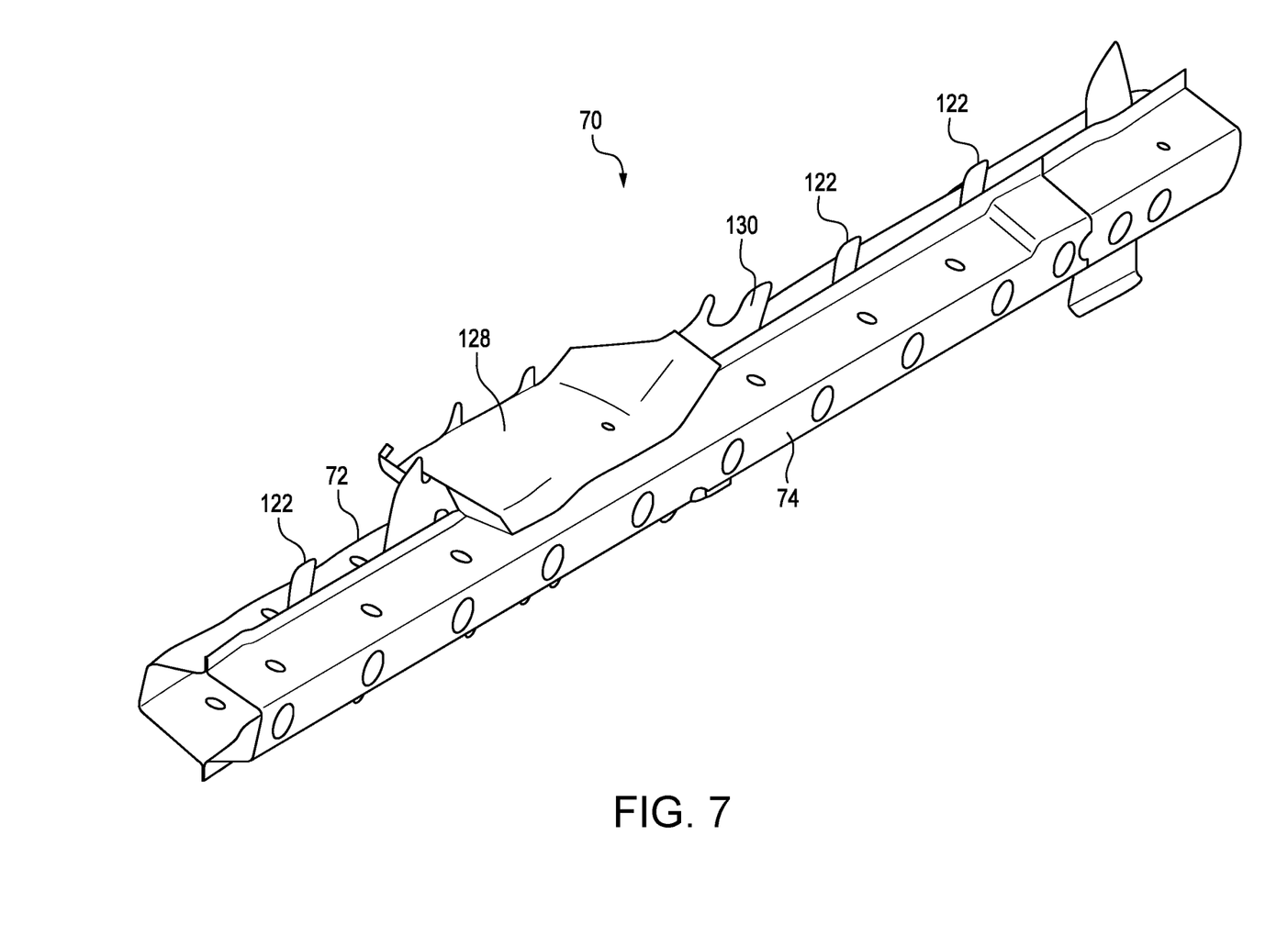
FIG. 7 is an inner perspective view of the reinforcement unit including a shear plate.
Figure 8:
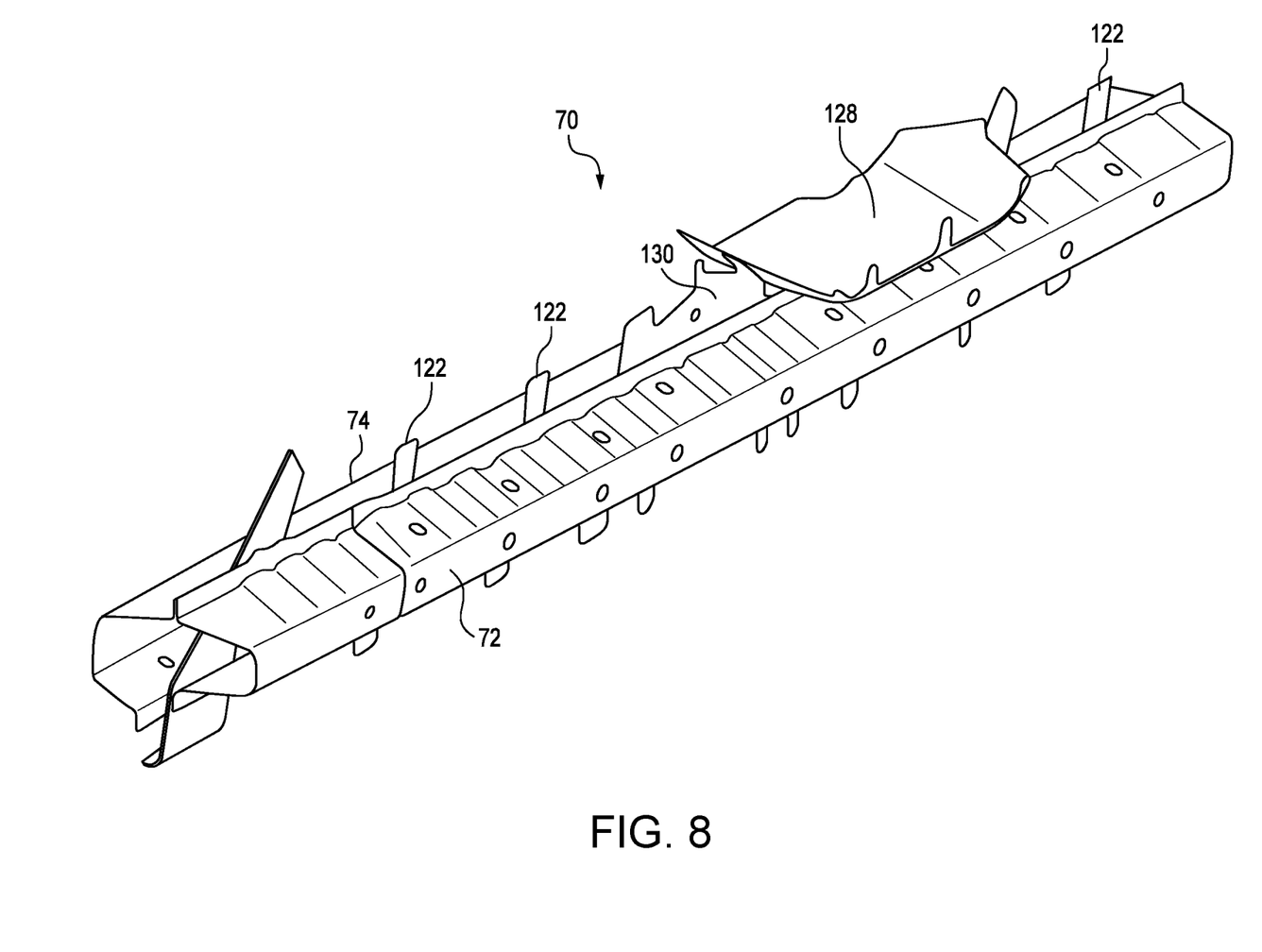
FIG. 8 is an outer perspective view of the reinforcement unit the shear plate.
Figure 9:
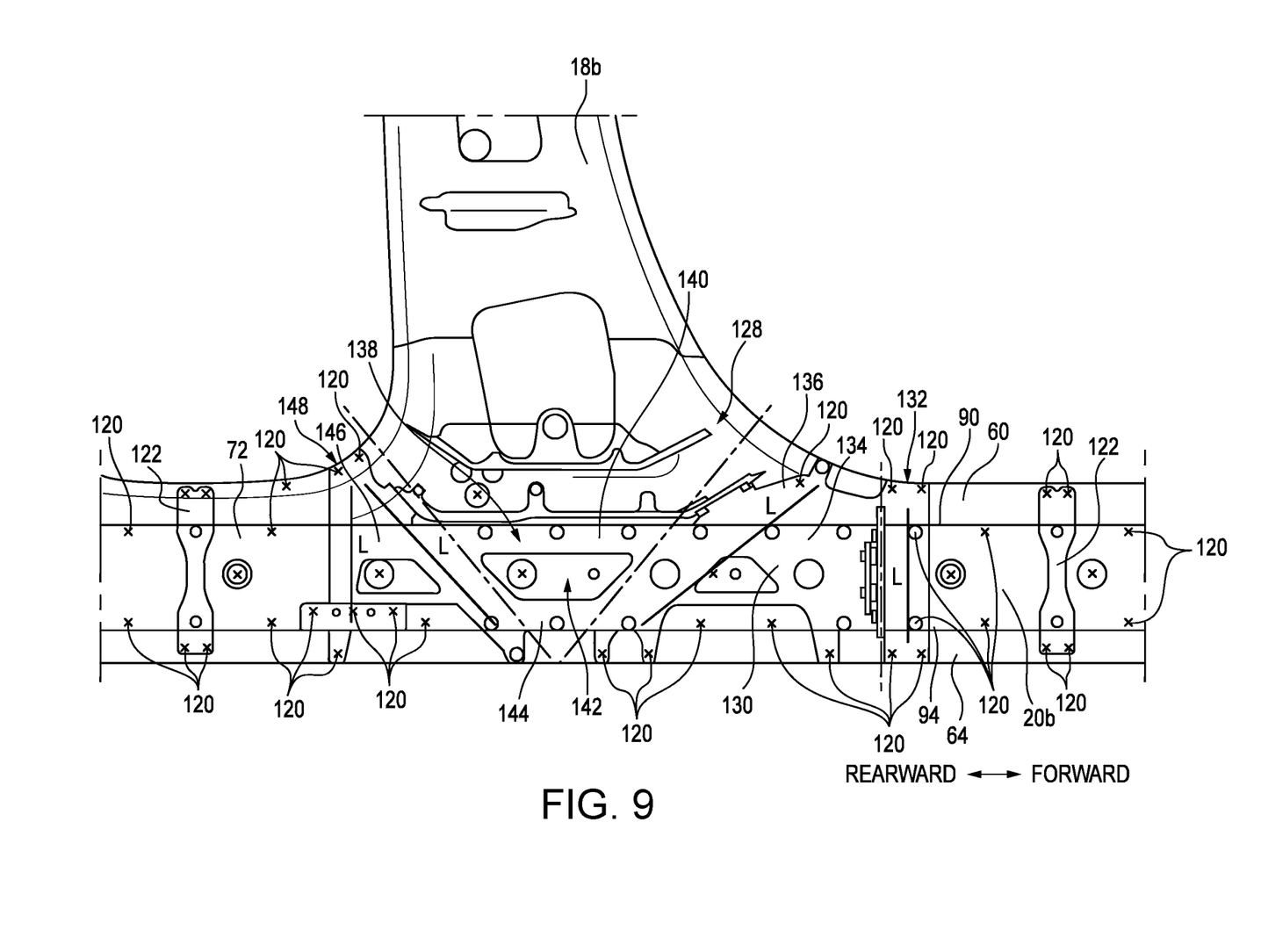
FIG. 9 is a view of an outer A-pillar panel, outer side sill panel, outer reinforcement member, and the shear plate.

As particularly illustrated in FIG. 9, with continuing reference to FIGS. 4 and 7-8, the shear plate 130 includes a longitudinally forward front portion 132 that is attached to the upper flange 60 and to the lower flange 64 of the outer side sill panel 20b and spanning from the upper flange 60 to the lower flange 64 between the outer reinforcement member 72 and the inner reinforcement member 74. The forward portion 132 of the shear plate 130 is further attached to the upper flange 90 and the lower flange 94 of the outer reinforcement member 72.

The shear plate 130 further includes a first A-shaped portion 134, directly longitudinally rearward of the front portion 132. The first A-shaped portion 134 is attached to the upper flange 60 and to the lower flange 64 of the outer side sill panel 20b and spans from the upper flange 60 to the lower flange 64 between the outer reinforcement member 72 and the inner reinforcement member 74. The first A-shaped portion 134 of the shear plate 130 is further attached to the upper flange 90 and the lower flange 94 of the outer reinforcement member 72. An upper portion 136 of the first A-shaped portion 134 is further forwardly adjacent the junction point 128 of the B-pillar 18 and the side sill 20.

The shear plate 130 further includes a transition portion 138, directly longitudinally rearward of the first A-shaped portion 134. The transition portion 138 is attached to the upper flange 90 and to the lower flange 94 of the outer reinforcement member 72. The upper portion 140 of the transition portion 138 is further adjacent and vertically directly below the junction point 128 of the B-pillar 18 and the side sill 20. The transition portion 140 has a hollow center 142 that separates the upper portion 140 from a lower portion 144, and thus does not span between the upper flange 90 and the lower flange 94 of the outer reinforcement member 72.

The shear plate 130 finally includes a second A-shaped portion 146, directly longitudinally rearward of the transition portion 140. The second A-shaped portion 146 is attached to the upper flange 60 and to the lower flange 64 of the outer side sill panel 20b and spans from the upper flange 60 to the lower flange 64 between the outer reinforcement member 72 and the inner reinforcement member 74. The second A-shaped portion 146 of the shear plate 130 is further attached to the upper flange 90 and the lower flange 94 of the outer reinforcement member 72. The upper portion 148 of the second A-shaped portion 146 is further rearwardly adjacent the junction point 128 of the B-pillar 18 and the side sill 20.

The attachments described above with regard to the shear plate 130, in the illustrated embodiment, are all by at least one weld 120, but any other attachment method known to a person of ordinary skill in the art may also be used.

As illustrated in FIG. 9, the shear plate 130 provides load paths, designated by lines L, between the upper flange 60 and the lower flange 64 of the outer side sill panel 20b and the upper flange 90 and the lower flange 94 between the outer reinforcement member 72 in the open large cavity between the inner side sill panel 20a and the outer side sill panel 20b of the side sill 20. The shear plate 130 also provides an increase in body rigidity at the junction 128 of the B-pillar 18 and the side sill 20.

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

In addition, the language used in the specification has been principally selected for readability and instructional purposes, and may not have been selected to delineate or circumscribe the inventive subject matter. Accordingly, the disclosure of the embodiments is intended to be illustrative, but not limiting, of the scope of the embodiments, which is set forth in the claims.

While particular embodiments and applications have been illustrated and described herein, it is to be understood that the embodiments are not limited to the precise construction and components disclosed herein and that various modifications, changes, and variations may be made in the arrangement, operation, and details of the methods and apparatuses of the embodiments without departing from the spirit and scope of the embodiments as defined in the appended claims.

What is claimed is:

1. A reinforcement unit for a side sill of a vehicle, the side sill comprising an inner panel and an outer panel having an upper flange and a lower flange, the reinforcement unit comprising:
    an outer reinforcement member located between the inner panel and the outer panel of the side sill;
    an inner reinforcement member located between the inner panel and the outer panel of the side sill; and
    a plurality of straps attached to the upper flange and to the lower flange of the outer panel and spanning from the upper flange to the lower flange between the outer reinforcement member and the inner reinforcement member, the inner reinforcement member being attached to the plurality of straps.

2. The reinforcement unit of claim 1 wherein the outer reinforcement member is attached to the outer panel.

3. The reinforcement unit of claim 2 wherein the outer reinforcement member is attached to each of the plurality of straps.

4. The reinforcement unit of claim 3 wherein the plurality of straps are attached to the upper flange and to the lower flange by welds.

5. The reinforcement unit of claim 4 wherein the outer reinforcement member is attached to the outer panel by a weld.

6. The reinforcement unit of claim 5 wherein the inner reinforcement member is attached to each of the plurality of straps by a weld.

7. The reinforcement unit of claim 6 wherein the outer reinforcement member is attached to each of the plurality of straps by a weld.

8. A side sill of a vehicle, comprising:
    an inner panel
    an outer panel having an upper flange and a lower flange; and
    a reinforcement unit, comprising:
        an outer reinforcement member located between the inner panel and the outer panel of the side sill;
        an inner reinforcement member located between the inner panel and the outer panel of the side sill; and
        a plurality of straps attached to the upper flange and to the lower flange of the outer panel and spanning from the upper flange to the lower flange between the outer reinforcement member and the inner reinforcement member, the inner reinforcement member being attached to the plurality of straps.

9. The side sill of claim 8 wherein the outer reinforcement member is attached to the outer panel.

10. The side sill of claim 9 wherein the outer reinforcement member is attached to each of the plurality of straps.

11. The side sill of claim 10 wherein the plurality of straps are attached to the upper flange and to the lower flange by welds.

12. The side sill of claim 11 wherein the outer reinforcement member is attached to the outer panel by a weld.

13. The side sill of claim 12 wherein the inner reinforcement member is attached to each of the plurality of straps by a weld.

14. The side sill of claim 13 wherein the outer reinforcement member is attached to each of the plurality of straps by a weld.

* * * * *